US008246775B2

(12) United States Patent
Ernst

(10) Patent No.: US 8,246,775 B2
(45) Date of Patent: Aug. 21, 2012

(54) METHOD OF IMPLANTING RFID TAGS IN CORRUGATED PAPERBOARD

(75) Inventor: Thomas Ernst, Oerlinghausen (DE)

(73) Assignee: Texmag GmbH Vertriebsgesellschaft, Thalwil (CH)

( * ) Notice: Subject to any disclaimer, the term of this patent is extended or adjusted under 35 U.S.C. 154(b) by 90 days.

(21) Appl. No.: 12/784,610

(22) Filed: May 21, 2010

(65) Prior Publication Data

US 2010/0224304 A1 Sep. 9, 2010

Related U.S. Application Data

(62) Division of application No. 11/671,635, filed on Feb. 6, 2007, now abandoned.

(30) Foreign Application Priority Data

Feb. 16, 2006 (DE) ........................ 10 2006 007 290

(51) Int. Cl.

| | |
|---|---|
| ***B29C 65/56*** | (2006.01) |
| ***B29C 65/54*** | (2006.01) |
| ***B32B 37/10*** | (2006.01) |
| ***B32B 37/14*** | (2006.01) |
| ***B32B 38/08*** | (2006.01) |
| ***B32B 38/10*** | (2006.01) |
| *B29C 65/78* | (2006.01) |
| *B32B 38/06* | (2006.01) |

(52) U.S. Cl. ........ 156/298; 156/235; 156/250; 156/297; 156/299; 156/439; 156/496

(58) Field of Classification Search .................. 156/235, 156/250, 297, 298, 299, 439, 496
See application file for complete search history.

(56) References Cited

U.S. PATENT DOCUMENTS

| | | | | |
|---|---|---|---|---|
| 6,206,292 | B1 * | 3/2001 | Robertz et al. | 235/488 |
| 6,481,631 | B1 * | 11/2002 | Poustis | 235/488 |
| 6,667,092 | B1 * | 12/2003 | Brollier et al. | 428/182 |
| 6,994,262 | B1 * | 2/2006 | Warther | 235/492 |
| 2003/0029063 | A1 | 2/2003 | Takesada et al. | |
| 2004/0065743 | A1 * | 4/2004 | Doublet | 235/487 |
| 2005/0242957 | A1 * | 11/2005 | Lindsay et al. | 340/572.7 |

FOREIGN PATENT DOCUMENTS

| | | |
|---|---|---|
| CN | 1703716 | 11/2005 |
| DE | 101 40 286 | 6/2003 |

(Continued)

OTHER PUBLICATIONS

English translation of DE10140286 by Panther, Wellpappen. Jun. 3, 2003.*

(Continued)

*Primary Examiner* — Sonya Mazumdar
(74) *Attorney, Agent, or Firm* — Fish & Richardson P.C.

(57) ABSTRACT

The disclosure concerns a method, an apparatus and a system for producing or equipping paperboard such that information carriers can be implanted between two layers of material, together with a piece of paperboard material produced in this way and a package. In particular, the disclosure concerns the implantation of an information carrier in corrugated paperboard, taking into account cuts that are subsequently to be made in the transverse direction, the distance of the position at which the cross-cuts are made from the position at which the information carriers are applied, and the movement executed by the web of material between the application position and the cross-cutting position.

19 Claims, 3 Drawing Sheets

FOREIGN PATENT DOCUMENTS

| | | | |
|---|---|---|---|
| DE | 10140286 | * | 6/2003 |
| EP | 1 284 320 | | 11/2005 |
| JP | 03-058053 | | 2/2003 |
| WO | WO99/31626 | | 6/1999 |
| WO | WO2004/029872 | | 4/2004 |
| WO | WO2005/015285 | | 6/2005 |
| WO | WO2006/119279 | | 11/2006 |
| WO | WO2007/084262 | | 7/2007 |

OTHER PUBLICATIONS

Cologne, "Nutzungsbedingungen zur Verwendung des EPC Logos" (English translation: "Conditions of use for the application of the EPC product logo"), Jun. 2005 [retrieved on Mar. 12, 2009]. Retrieved from the internet <URL: http://ww.epcglobalinc.org/public/ppsc_guide/print >.

Third-party objection in the corresponding EP application: EP1820899.

Japanese office action for corresponding application 2007-0037117 dated Feb. 26, 2010 (English translation is included).

Chinese office action for corresponding application 200710084077.1 dated Nov. 27, 2009 (English translation is included).

Examination report dated Oct. 4, 2010 received in corresponding application TW 96102654.

Uncertified machine translation of description of EP1284320, downloaded from ESP@cenethttp://translationportal.epo.org/emtp/translate/?ACTION=description-retrieval;&COUNTRY=EP &FORMAT=docdb&KIND=A2&LOCALE=en_EP &NUMBER=1284320&OPS=ops.epo.org&W=1329831364489 &TRGLANG=en&ENGINE=google&SRCLANG=de (5 pages).

Prosecution history in parent U.S. Appl. No. 11/671,635.

Uncertified machine translation of excerpt from letter of opposition filed Apr. 21, 2010 in European Patent No. 1820899 (8 pages).

* cited by examiner

METHOD OF IMPLANTING RFID TAGS IN CORRUGATED PAPERBOARD

CROSS-REFERENCE TO RELATED APPLICATIONS

This application is a divisional application of and claims priority to U.S. application Ser. No. 11/671,635, filed on Feb. 6, 2007, which claims the benefit under 35 U.S.C. §119 of German patent application serial number 102006007290.1, filed Feb. 16, 2006, the contents of both of which are incorporated by reference herein.

FIELD

The disclosure concerns a method, an apparatus and a system for producing or equipping paperboard such that information carriers can be implanted between two layers of material, together with a piece of paperboard material produced in this way and a package.

BACKGROUND

Apparatuses for producing corrugated paperboard having the basic construction shown in FIG. 1 are known from the prior art. Such an apparatus includes one or more single facer units, in each of which a smooth and a fluted web are joined together. The webs so joined are called single-face webs. In double-backing and laminating, the single-face webs and a liner web are joined to form a single web and are laminated. The area extending thus far is also known as the wet end. After laminating, the web is put through a heating and stretching area. Here, the web is dried by the application of heat. During the concluding final processing, the corrugated paperboard web is trimmed at the edges, undergoes further cutting as needed into desired formats, and is sent to storage.

Also known from the prior art are information carriers such as RFID tags/RFID transponders (RFID stands for Radio Frequency Identification), which can be used for example to identify articles in a warehouse. Such tags can be read without contact; thus, a shopping basket full of merchandise need not be emptied in order to be scanned at a checkout counter. In the prior art, RFID tags are glued to packaging like conventional price labels.

Gluing tags to merchandise by hand is error-prone and onerous.

SUMMARY

A feature underlying the present disclosure is, therefore, to improve the known methods and apparatuses.

According to the disclosure, this object can be achieved by use of a method, a piece of paperboard material, a packaging, an apparatus and a system according to the appended independent claims. Advantageous embodiments are described in the dependent claims.

According to the disclosure, for unbroken tracking of the flow of shipping packages and automatic content identification, an internally disposed RFID tag is provided inside the corrugated paperboard or between the individual webs thereof. To this end, the tag should be implanted on the corrugated paperboard apparatus during the process of manufacturing the corrugated board. Correct positioning in both the longitudinal and the transverse direction is also an aspect of the disclosure.

According to the disclosure, a method of producing paperboard or a web of paperboard material is provided in which at least two layers of material are joined together and information carriers are implanted between said at least two layers. Preferably at least one of the layers of material is a single-face web, which can be produced by means of a single-facer section of the corrugated paperboard apparatus.

The information carriers can be applied to a layer of material carrying the information carriers before that layer is joined to an additional layer of material covering the information carriers. This preferably takes place before the laminating station and after the glue machine.

Once all the layers of material have been joined together, the web of material is severed in the transverse direction (the x-direction), "transverse direction" being considered relative to the direction of travel, to divide the web of material into pieces of material, the information carriers previously being implanted such that they are thereupon located at predefined positions in the pieces of material. To achieve this, attention must be paid in particular to the web position and/or the web speed and/or the idle time between the application of the information carrier and said severance in the transverse direction.

During the production of the web of material, the layers of material are moved in the longitudinal direction (the y-direction), the longitudinal direction being considered relative to the direction of travel, and the information carriers are applied to the carrying layer at positions that are time-controlled relative to the longitudinal extent of that layer, taking into account predefined cuts that are subsequently to be made in the transverse direction (the x-direction), the distance of the position at which the cuts are made from the position at which the information carriers are applied, and the movement executed by the web of material between the application position and the cross-cutting position.

Provided at the application position is a positioning system equipped with a storage magazine for information carriers, such that by means of the positioning system the information carriers can be continuously applied to the carrying layer moving past the positioning system.

The method is performed in a corrugated paperboard apparatus having a wet end and a dry end. The wet end is composed of the single-facer sections and the double-backer and laminating station from FIG. 1. The dry end includes the heating and stretching area and the final processing station.

The corrugated paperboard apparatus used can comprise at least one single-facer section, one double-backer station, one laminating station, one heating and stretching area and/or one final processing station.

The information carriers contain devices whereby the information from the information carriers can be read by means of electromagnetic radiation, acoustomagnetic radiation, radiofrequency waves and/or ultrasonic waves; the information carriers are in particular RFID transponders or EAS tags.

Optionally, at least one of the external webs can be provided with a marking drawing attention to the internally disposed information carrier. Such a marking can for example be a colored marking, a label, or an inline-printed marking.

Providing a marking has the advantage of making it easy to orient the blank in relation to the information carrier. This prevents any accumulating offset that would result in some blanks not being provided with information carriers, and the information carrier is always in the same position in a package formed from the blank. The blank can be optimally oriented in the corrugated paperboard apparatus, thus preventing any miscutting. In addition, the externally visible marking can make it possible for an automatic RFID scanner to precisely pinpoint the location of the RFID tag, thereby increasing reading reliability. This has corresponding logistical advantages when a package is used to ship goods.

The disclosure also includes a piece of paperboard material, particularly corrugated paperboard material, which is produced according to one of the described inventive methods or which contains an information carrier inside the layers of paperboard or corrugated paperboard material. The piece of material has advantages that are achieved by virtue of the inventive method: for example, the information carriers can each contain a device whereby the information from the information carrier can be read by means of electromagnetic radiation, acoustomagnetic radiation, radiofrequency waves and/or ultrasonic waves. The information carriers can be RFID transponders or EAS tags.

According to a further aspect of the disclosure, a package consisting partially or completely of paperboard, particularly corrugated paperboard, is provided, an information carrier being contained in said paperboard. This package has the advantages resulting from one of the inventive methods or from the piece of paperboard material.

The disclosure further makes available an apparatus able to perform all aspects of the inventive method and comprising means adapted and suitable for this purpose. All of the above statements apply analogously.

Also made available is a system for applying information carriers to a material, said system comprising at least one positioning system that can be arranged inside the apparatus in such a way that the information carriers can be implanted between two layers of material.

The positioning system is advantageously connected to a controller, which is suitable for controlling the positioning system in such fashion that the information carriers are subsequently disposed at predefined positions in the pieces of material.

A controller optionally controls the positioning system in the application of the information carriers relative to the longitudinal direction (the y-direction) of the layer of material or of the single-face web, taking the following parameters into account: the distance of the positioning system from the cross-cutter, the nature and speed of the movement executed by the web of material between the positioning system and the cross-cutter, and/or the geometry of the predefined pieces of material.

At least one sensor is preferably provided to measure the speed of the web of material between the positioning system and the cross-cutter. The positioning system can include a storage magazine for information carriers, such that by means of the positioning system the information carriers can be continuously applied to a carrying layer of material or a single-face web.

BRIEF DESCRIPTION OF THE DRAWINGS

Further aspects and advantages of the present disclosure will become clear from the detailed description of the appended drawings.

DETAILED DESCRIPTION

Figure 1:
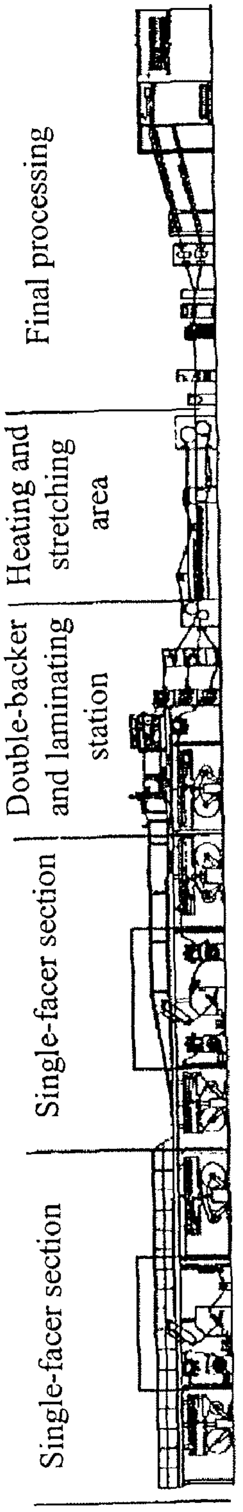
FIG. 1 is a schematic overall diagram of an apparatus for producing corrugated paperboard.
Figure 2:
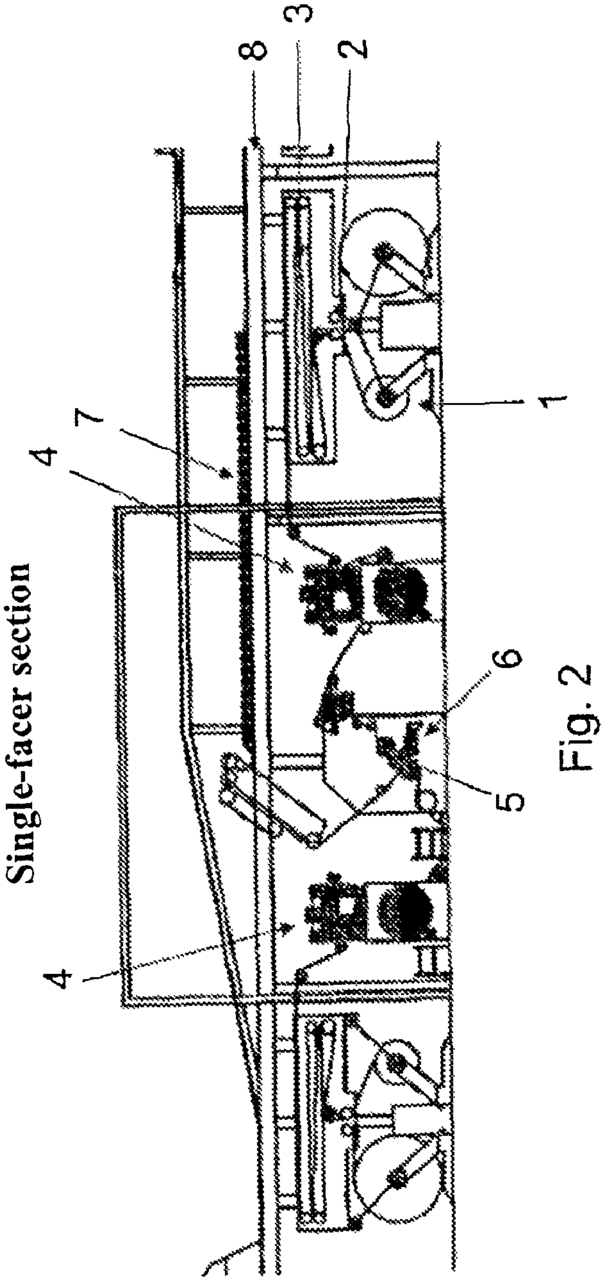
FIG. 2 is a schematic diagram of a single-facer section of an apparatus for producing corrugated paperboard.

FIG. 2 is a schematic diagram of a single-facer section. An apparatus for producing corrugated paperboard can include one or more single-facer sections of this kind. They are identical in function and basic construction.

The paper or paper-like feedstock is disposed on supply rolls 1. The supply rolls 1 are always arranged in pairs, the material being unwound from one roll while the other roll is held ready as a replacement. When the material from one roll is used up, a splice is made to the other roll at location 2, so that the feed of material is not interrupted. From there, the paper is routed into a first material magazine 3. Here, paper is stored to compensate for the delay in the paper feed that occurs when a splice is made to a new roll. To regulate the stored content in the magazine 3, the deflecting rolls on the right and the left in the magazine can be moved toward or away from each other.

From the first magazine 3, the paper is routed to the position influencing device 4. After said position influencing device 4, the paper is guided over rollers, where it is heated, particularly by means of rollers that are fed internally with steam. The paper is also moistened along the way to make it more malleable and to facilitate the joining of two layers of paper later on.

The web coming from one side is then routed over a corrugating roll 5, where it is forced into a corrugated shape. The gluing device 6 applies glue to this web. From the other side comes a second web, which is then glued together with the corrugated web to form a single-face web.

The resulting single-face web is fed onto the bridge 8. A second supply of feedstock, the so-called bridge stock 7, is located here. This serves as backup as production continues. During the changeover splicing of one supply roll 1 to another, production of the single-face web is usually slowed to permit more reliable and therefore slower splicing-on. The bridge stock 7 serves as a backup for this time interval, so the production process can continue at a speed of about 100 to 400 meters per minute. After the change has been made to the new supply roll 1, the speed that is maintained during the production of the single-face web is increased to an above-average value to replenish the bridge stock 7.

Figure 3:
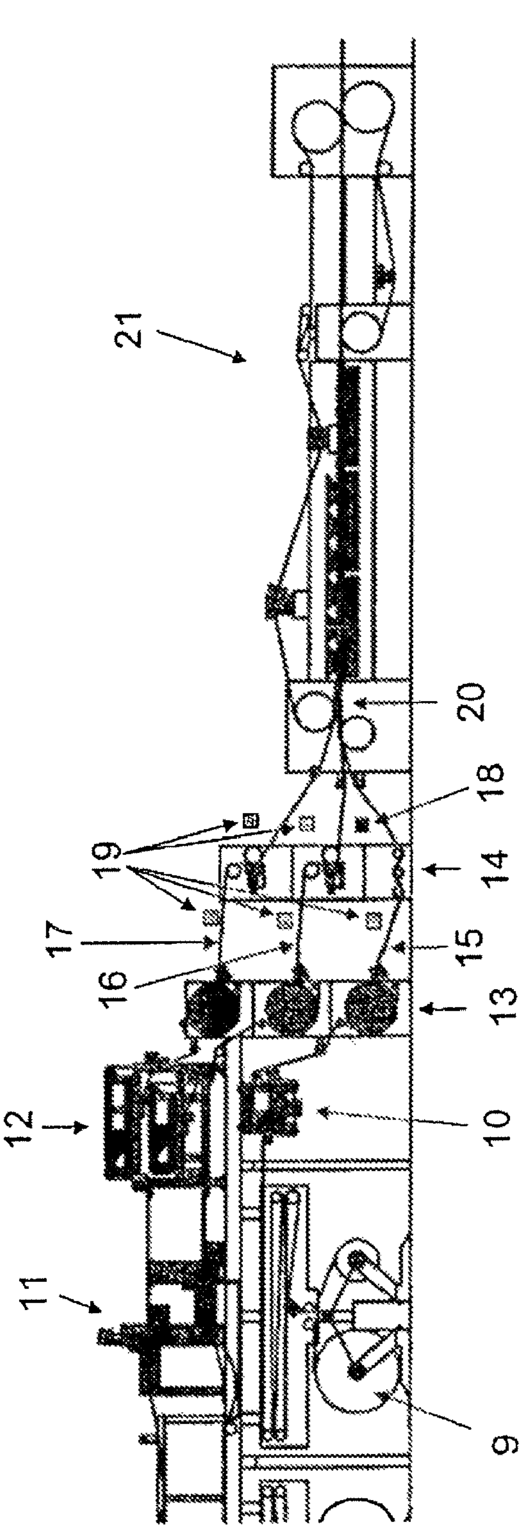
FIG. 3 is a schematic diagram of a double-backer, a laminating station and a heating and stretching area according to the present disclosure.

FIG. 3 is a schematic diagram of a double-backer, a laminating station and a heating and stretching area. The one or more single-face webs are conveyed hereto. The position influencing devices 11, 12 adjust the respective positions of the single-face webs and the necessary web tensions. The bottom liner is routed from a bottom liner supply roll 9 through a supply magazine to the position influencing device 10.

After the position influencing devices 10, 11, 12, the webs are passed over a preheater 13 and a glue machine 14 to the laminating station 20, where the webs are assembled. At this juncture, it is desirable for the webs to be positioned as exactly as possible in relation to one another.

Prior to lamination, information carriers 26, e.g. RFID tags, are applied by the system 18 to the single-face web 16 before it is united with the liner web 15. The RFID tags 26 are preferably applied to the web 16 between the glue machine 14 and the laminating station 20, since the freshly applied glue helps the tags 26 to adhere. The tags 26 can be applied for example by mechanical or pneumatic processes. Alternatively or additionally, the system for applying tags 26 can also be deployed at the positions indicated by reference numeral 19. This makes it possible to implant tags 26 between different layers of a multilayer corrugated paperboard web.

Corrugating machines are able to process more than one order at a time. The web can be divided lengthwise by a scoring and cutting machine 24. The thus-separated sides of a web can then be processed further in various ways. It may be desirable for each end product to be provided with an RFID tag 26. For this reason, the system 18 can be designed to include a plurality of applying heads that can be controlled independently from one another. The applying heads can then be moved transversely to the direction of travel of the web and can apply RFID tags 26 at different time intervals.

Figure 5:
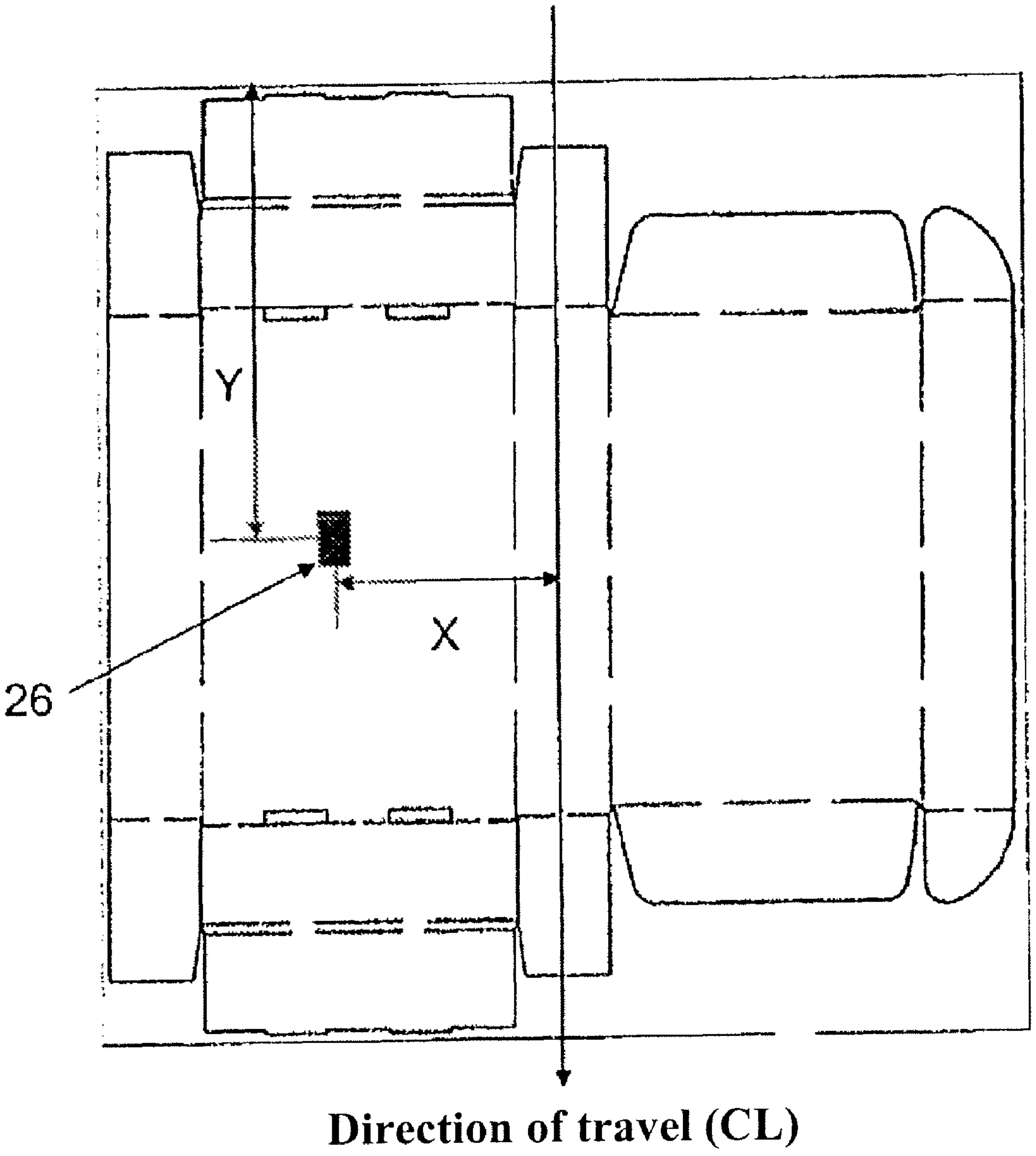
FIG. 5 is a schematic diagram of a paperboard equipped with information carriers according to the present disclosure.

During job set-up, all the required measurements, such as for example the complete contour of the subsequent cardboard box, are known. This is true of all required allowances, punch-outs, scoring, hand grip apertures, etc. These data are delivered to the control system and used in positioning the RFID tags 26. In addition, it must be determined via job set-up/planning at what position the RFID tags 26 are to be implanted inside the corrugated paperboard, such as for example in relation to other cut/scored edges or a coordinate reference point. FIG. 5 furnishes more detail in this regard.

The system 18 includes a magazine for a sufficient number of tags and a positioning apparatus for the applying head or heads. This positioning apparatus is operative to move to any arbitrary position transversely to the direction of travel of the paper and thus to bring the applying head into the desired position relative to the position of the web.

The required position of the RFID tag 26 can be precisely determined via optional additional measurements of the web positions and widths in the area of the double-backer, which can be installed near the position influencing devices 10, 11, 12, and in the area of the scoring and cutting machine 24. Auxiliary measures can include still further measuring systems for determining width, position, shrinkage, etc. or, alternatively, an edge trim determination system, which characterizes the offcut in the area of the scoring and cutting machine. The tag can thus be implanted precisely at the target location prior to lamination 20.

The following procedure can be used to position the tag in the longitudinal direction. In the cross-cutter 25, the web is cut in the transverse direction to the format length needed for further processing. Hence, to position the tag 26 properly in the front portion of the corrugator, the moment of implantation must be synchronized so that it occurs at the proper position relative to the crosscut line on the cross-cutter 25. The cutting signal from the cross-cutter can be used for this purpose. Combined with a speed calculation or alternatively a length measurement of the goods, this makes it possible to determine the correct moment of implantation of the RFID tag 26. The speed of the web can be detected for example via a speed measuring means 22. The distance between system 18 and the cross-cutter 25 is known from the layout of the installation. When especially precise positioning of the RFID tag 26 is desired, the actual, current web speed should be taken into account in controlling the system 18. At web speeds of approximately 100 to 400 meters per minute, allowance for web speed variations is an important factor.

It should also be noted that during job changes, i.e. when production is being switched over to a different paperboard end-product, timely shifting of the implanting positions may be necessary. This must be taken into account in the control of system 18.

The apparatus further comprises a short cross-cutter 23. This serves to cut off waste, particularly after a format change or in the event of a machine stoppage. This short cross-cutter 23 usually has a different cycle length than the format length, so the pieces it removes may have to be taken into account in the control of system 18.

Following lamination 20, the web is dried in the heating and stretching area 21. Revolving belts pull the web through this area, conveying it past heating elements. The application of heat extracts moisture from the paperboard and dries it.

Figure 4:
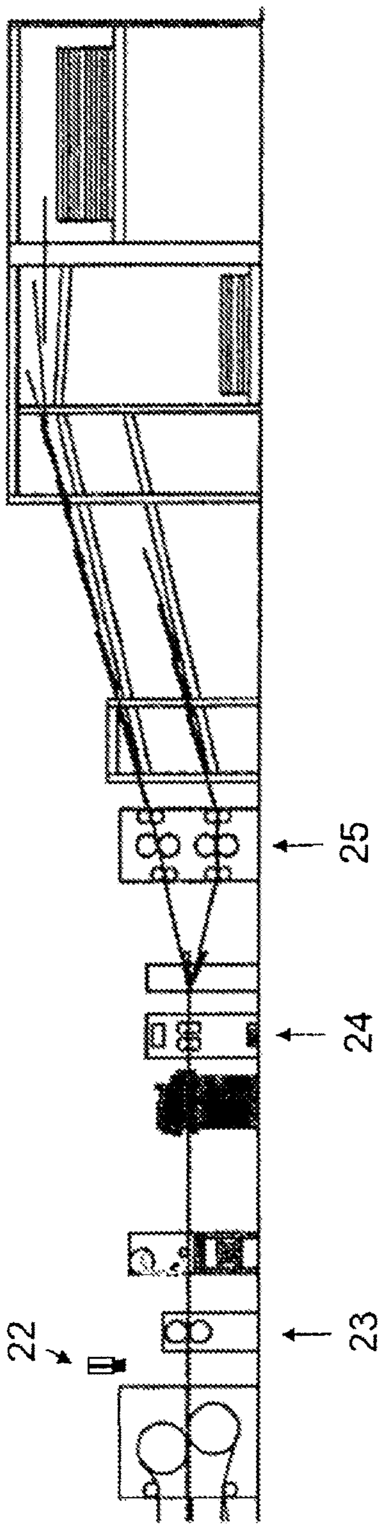
FIG. 4 is a schematic diagram of a final processing station according to the present disclosure.

FIG. 4 is a schematic diagram of a final processing station. The web speed is detected by the speed measuring means 22. The web is then routed from the short cross-cutter 23 to the scoring and cutting machine 24. In the cross-cutter 25, the web is cut crosswise to the desired measurements and routed to a storage area, which is illustrated schematically at the right-hand side of FIG. 4.

FIG. 5 shows an example of a sheet of corrugated paperboard trimmed to size in the longitudinal and transverse directions and comprising an information carrier 26 according to the disclosure, with scores (subsequent fold lines) incorporated in the longitudinal direction. Cuts and folds transverse to the direction of travel (CL) are made at the final processing station.

The position of the tag 26 is determined by its distance from the axis in the direction of travel, i.e. the x-coordinate, and by its distance from the rough edge that is the trailing edge in the direction of travel and that runs transverse to the direction of travel, i.e. the y-coordinate. The skilled person may, of course, choose a different suitable system of coordinates. In such position identification, it should be taken into account that a marginal strip has yet to be cut off in the corrugating apparatus, corresponding shrinkage will occur due to drying, and some material has yet to be cut away from all four rough edges of the format during further processing. Suitable allowance must be made for all these factors so that after final processing the RFID tag 26 will be implanted at the correct position with respect to the specified positions of the reference edges or scores. The desired position of the RFID tag 26 can advantageously be input or changed by an operator of the apparatus via a user-friendly interface, e.g. one equipped with a display similar to that shown in FIG. 5. The control of the apparatus can also be designed so that the position for the RFID tag 26 can be input at the same time as the specifications for a job order.

At least one of the outer webs 15 or 17 can optionally be provided with a marking drawing attention to an internally disposed information carrier 26. Such markings preferably are not applied until after the heating and stretching area 21. They should be visible subsequently from the outside, so it can also be advantageous if they are not applied until the subsequent final processing. If they are applied in connection with the production of corrugated board, all the data and control variables that are already available for positioning the RFID tag 26 can be used analogously to position the markings. For example, it is possible to position the markings in synchronization with the application of the RFID tag 26.

As described above and as can be seen for example in FIG. 5, at least one of the outer webs 15 or 17 can be provided with a marking (X, Y) that indicates the x- and y-positions of the internally disposed information carrier. All the data and control variables that are already available for positioning the RFID tag 26 can be used in an analogous manner to position the markings. For example, it is possible to position the markings in synchronization with the application of the RFID tag 26.

Providing a marking has the advantage that the blank can be oriented relative to the information carrier in a simple manner. This prevents any accumulating offset that would result in some blanks not being provided with information carriers, and the information carrier is always in the same position in a package formed from the blank. The blank can be optimally oriented in the corrugated paperboard apparatus, thus preventing miscutting. In addition, the externally visible marking can make it possible for an automatic RFID scanner to precisely pinpoint the location of the RFID tag, thereby increasing reading reliability. This has corresponding logistical advantages when a package is used to ship goods.

The invention claimed is:

1. A method of producing paperboard or a web of paperboard material, the method comprising joining at least two layers of material together, the joining including positioning and implanting an information carrier between the at least two layers of material and providing at least one outer surface of the paperboard or of the web of paperboard material with a marking that indicates the x- and y-positions of the internally disposed implanted information carrier, wherein positioning the information carrier comprises moving an application head that applies the information carrier transversely to a direction of travel of the corrugated paperboard as it moves longitudinally past a first position at which the information carrier is applied, the providing of the marking including positioning the marking using data and control variables that have been used for the positioning and the implanting of the information carrier.

2. The method of claim 1, further comprising applying the information carrier to a layer of material carrying said information carrier before said layer of material is joined to another layer of material covering said information carrier.

3. The method of claim 1, further comprising severing the paperboard or the web of material in the transverse x-direction to singulate said paperboard or said web of material into pieces of material after all said layers of material have been joined together.

4. The method of claim 3, further comprising moving the layers of material in the longitudinal direction and applying the information carrier to a carrying layer in a time-controlled manner at positions relative to the longitudinal extent of said layer of material, the application taking into account predefined cuts that are to be made in the transverse direction, the distance of the position at which cross-cuts are made from the position at which said information carriers are applied, and the movement executed by the paperboard or the web of material between the application position and the cross-cutting position.

5. The method of claim 1, wherein the information carrier is a device from which information can be read by electromagnetic radiation, acoustomagnetic radiation, radiofrequency waves, of ultrasonic waves.

6. The method of claim 1, wherein the information carrier is an RFID transponder or an EAS tag.

7. A method for producing paperboard or a web of paperboard material that comprises a first layer and a second layer, the method comprising:

applying an information carrier to a first web as it moves longitudinally past a first position, wherein applying the information carrier comprises moving an application head that applies the information carrier transversely to a direction of travel of the first web as it moves longitudinally past the first position;

after the information carrier is applied to the first web, uniting the first web with a second web, the first and second webs thereby each forming a respective of the first and second layers of the paperboard or the web of paperboard material, the uniting implanting the information carrier between the first and second layers; and after the information carrier is applied to the first web, applying a marking to an outer surface of the paperboard or of the web of paperboard material, wherein the marking is positioned to indicate the position of the information carrier between the first and second layers of the paperboard or the web of paperboard material.

8. The method of claim 7, wherein:

applying the information carrier to the first web comprises a control system receiving control data and using the control data to position the application of the information carrier; and applying the marking to the outer surface comprises using the same control data to position the marking.

9. The method of claim 7, wherein applying the marking comprise applying a colored marking.

10. The method of claim 7, wherein applying the information carrier to the first web comprises applying the information carrier to a glued surface of a single-face web.

11. The method of claim 7, wherein:

the information carrier is applied to the first web downstream of a glue machine and upstream of a laminating station; and the uniting of the first web with a second web comprises laminating the first web to a second web at the laminating station.

12. The method of claim 7, further comprising drying the paperboard or the web of paperboard material in an heating and stretching area after the uniting of the first web with a second web but before the application of the marking.

13. The method of claim 7, wherein the applying of the marking occurs after the uniting of the first web with the second web.

14. A method comprising:

producing corrugated paperboard comprising a cover layer, a second layer, and an RFID tag contained between the cover layer and second layer and thereby implanted within the corrugated paperboard, the producing of the corrugated paperboard comprising applying an RFID tag to one of the cover layer and the second layer of the corrugated paperboard as it moves longitudinally past a first position, wherein applying the RFID tag comprises moving an application head that applies the RFID tag transversely to a direction of travel of the corrugated paperboard as it moves longitudinally past the first position, and downstream of the first position and after application of the RFID tag, applying a marking to an outer surface of the cover layer, the marking indicating the longitudinal and lateral position of the implanted RFID tag between the cover layer and second layer.

15. The method of claim 14, further comprising moving a second application head that applies a second RFID tag independently of the application head.

16. The method of claim 14, wherein:

the first position is downstream of a glue machine and upstream of a laminating station; and the method further comprises laminating the cover layer and the second layer at the laminating station.

17. The method of claim 16, further comprising drying the paperboard or the of paperboard material in an heating and stretching area after laminating the cover layer and the second layer but before the application of the marking.

18. The method of claim 14, further comprising:

orienting a corrugated paperboard blank relative to the RFID tag using the marking; and cutting the thus oriented corrugated paperboard blank.

19. The method of claim 14, wherein:

applying the RFID tag comprises a control system receiving control data and using the control data to position the application of the RFID tag; and applying the marking to the outer surface of the cover layer comprises using the same control data.

* * * * *

UNITED STATES PATENT AND TRADEMARK OFFICE
CERTIFICATE OF CORRECTION

PATENT NO. : 8,246,775 B2
APPLICATION NO. : 12/784610
DATED : August 21, 2012
INVENTOR(S) : Thomas Ernst It is certified that error appears in the above-identified patent and that said Letters Patent is hereby corrected as shown below:

In Column 7, Line 52, In Claim 5, delete “of” and insert -- or --, therefor.

In Column 8, Line 16, In Claim 9, delete “comprise” and insert -- comprises --, therefor.

In Column 8, Line 61, In Claim 17, delete “the of” and insert -- the web of --, therefor.

Signed and Sealed this
Eighth Day of January, 2013

David J. Kappos
*Director of the United States Patent and Trademark Office*